Nov. 14, 1967    J. L. GRAHAM    3,352,673
MULTILAYER COLOR PHOTOGRAPHIC ELEMENT
Filed Oct. 28, 1963
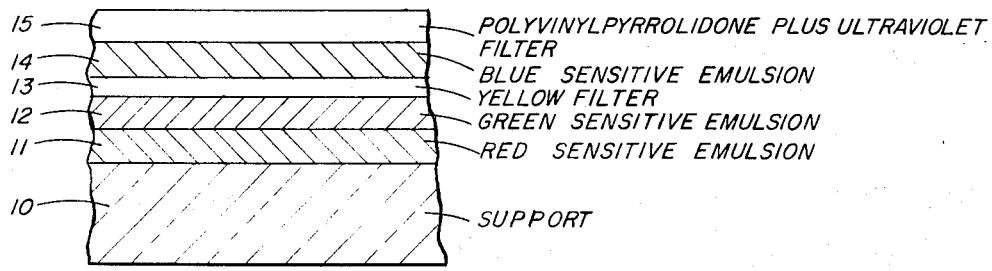
JAMES L. GRAHAM
INVENTOR.
BY R. Frank Smith
Lawrence H. Willis
ATTORNEYS

United States Patent Office 3,352,673
Patented Nov. 14, 1967

3,352,673
MULTILAYER COLOR PHOTOGRAPHIC
ELEMENT
James L. Graham, Rochester, N.Y., assignor to Eastman Kodak Company, Rochester, N.Y., a corporation of New Jersey
Filed Oct. 28, 1963, Ser. No. 319,332
16 Claims. (Cl. 96—22)

This invention relates to color photography and more particularly to color photographic elements protected against the harmful effects of ultraviolet radiation during photographic exposure.

In color photography, it is highly desirable to avoid the action of ultraviolet radiation on the emulsions which record the colored images. The theory of color photography depends upon the use of sensitive media which record the colors to which the eye is sensitive, and the color values are obviously falsified when radiations invisible to the eye are recorded in the light-sensitive elements. Photographic emulsions are inherently highly sensitive to blue light and this sensitivity frequently extends into the ultraviolet region of the spectrum. The eye has its highest sensitivity to green light, but sensitivity decreases as the wavelength of light decreases while that of the photographic emulsion increases as the wavelength decreases toward the violet and ultraviolet spectral region. This difference between the sensitivity of the eye and the sensitivity of the phtographic emulsion should, therefore, be compensated by selectively altering the sensitivity of the photographic material to obtain correct color reproduction.

This falsification of color reproduction is especially noticeable in multilayer photographic materials designed for use in color photography wherein the ultraviolet radiation may cause undesired exposure of a layer, or layers, since many photographic silver halide emulsions are inherently sensitive to blue, violet and ultraviolet regions of the spectrum, as well as to the longer wavelength regions to which they may have been sensitized.

It is desirable, therefore, to incorporate an ultraviolet light-absorbing compound, which absorbs substantially all wavelengths below about 420 mµ, but which has no substantial absorption in the visible region of the spectrum, i.e., from about 420–700 mµ, in the multilayer photographic element. Ultraviolet light-absorbing compounds which meet these specifications have a somewhat yellowish or straw color. One method of incorporating such absorbers is to ballast the ultraviolet light-absorber with a long alkyl chain (e.g., at least 7 carbon atoms). This method, however, results in the yellow absorber remaining in the photographic element after processing and thereby exhibiting a high, yellow stain. Another method is to mordant an unballasted ultraviolet light absorber with a material which will retain the absorber in place. It has been found, however, that this latter method also tends to produce yellow stain in the multilayer element after processing, since conventional mordants tend to retain colored materials, or inbibed processing chemicals which readily become colored in the presence of air.

I have now found a class of polymeric mordants, poly-N-vinyllactams, which can be ultilized to mordant unballasted (i.e., diffusible) ultraviolet light absorbers in multilayer photographic elements to provide effective protection therein from undesirable ultraviolet radiation during exposure, without producing stain in the element during or after processing.

It is, therefore, an object of my invention to provide novel photographic elements protected against the harmful effects of ultraviolet radiation. A further object is to provide photographic color materials protected against the harmful effects of ultraviolet radiation without the production of stain therein during or after processing. An additional object is to provide photographic color materials which have been protected against the harmful effects of ultraviolet radiation. Other objects will become apparent from a consideration of the following description and examples.

The accompanying drawing represents a sectional view of a multilayer film according to my invention having an ultraviolet light filter layer containing a poly-N-vinyllactam mordant therein. As shown in the single figure of the drawing, a support 10 of any suitable material, such as cellulose acetate, paper or the like having thereon a red-sensitive emulsion layer 11, a green-sensitive emulsion layer 12, a yellow filter layer 13, and a blue-sensitive emulsion layer 14 is coated with an ultraviolet light filter layer 15 containing an unballasted, ultraviolet light absorber and a poly-N-vinyllactam mordant. It will be understood that the drawing is merely representative of other structures which can be employed in my invention and that the element can contain other layers, not shown, such as additional light-sensitive layers, subbing layers, antihalation layers, etc. It will also be realized that the arrangement of the layers in the accompanying drawing is merely representative and that the layers in the element may be arranged in a different fashion if need be, e.g., in certain cases it may be desirable to coat an ultraviolet light filter layer according to my invention in other positions in the film, such as on the back of the support for the purpose of absorbing any ultraviolet light which may affect the film during exposure or processing, between the blue and green sensitive layers or between the green and red sensitive layers, if desired.

It will be realized that each of the silver halide emulsion layers can contain dye-forming compounds (i.e., couplers) which unite during the development of the silver image with the oxidation products of an aromatic amine developing agent to form a dye, or may be free of such color-formers, in which case the film is processed with the color-formers in the color developers by selective re-exposures and color developments as described in Mannes et al. U.S. Patent 2,252,718, issued Aug. 19, 1941.

According to my invention a poly-N-vinyllactam is utilized to mordant an unballasted and otherwise diffusible ultraviolet light-absorbing compound in an ultraviolet absorbing layer. The following compounds are representative of unballasted, ultraviolet light-absorbing compounds that can be utilized in my invention:

I. Substituted 2,5-bis-thiazolo-[5,4-d]thiazoles of general formula:

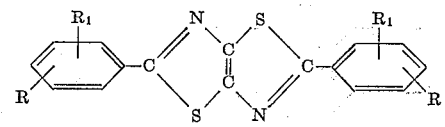

wherein R represents hydrogen, lower alkyl (e.g., methyl, ethyl, propyl, n-butyl, etc.), alkoxy (e.g., methoxyl, ethoxyl, butoxyl, etc.), hydroxyl, cyano, halogen (e.g., chlorine, bromine, etc.), amino (including substituted amino), etc., and $R_1$ represents sulfo (including alkali metal salts thereof) or carboxy (including alkali metal salts thereof).

Typical useful compounds in this class are:

Ia. 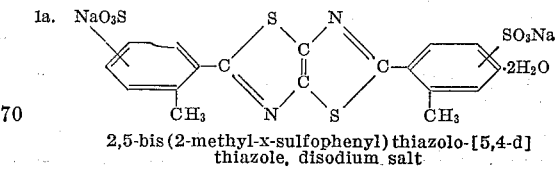

2,5-bis(2-methyl-x-sulfophenyl)thiazolo-[5,4-d]
thiazole, disodium salt

1b.

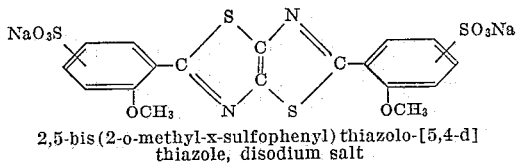

2,5-bis(2-o-methyl-x-sulfophenyl)thiazolo-[5,4-d]
thiazole, disodium salt

II. Thiazolidones of general formula:

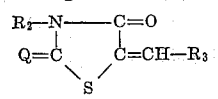

wherein $R_2$ represents a hydrogen atom, a lower alkyl group (e.g., methyl, ethyl, propyl, isopropyl, etc.), or an aryl group (e.g., phenyl, o-, m- and p-tolyl, o-, m- and p-chlorophenyl, etc.); $R_3$ represents sulfo (including alkali metal salts thereof) or carboxy (including alkali metal salts thereof) substituted aryl groups; Q represents a divalent, non-metallic atom (e.g., oxygen, sulfur, etc.) or radical (e.g., imino, phenylimino, o-, m- and p-chlorophenylimino, etc.).

Typical useful compounds in this class are:

2a.

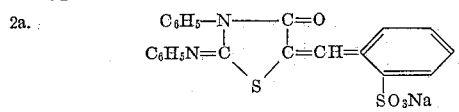

3-phenyl-2-phenylimino-5-o-sulfobenzal-4-
thiazolidone, sodium salt

2b.

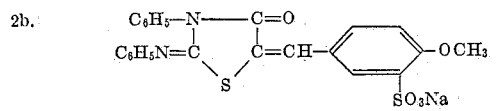

5-(4-methoxy-3-sulfobenzal)-3-phenyl-2-phenylimino-
4-thiazolidone, sodium salt

2c.

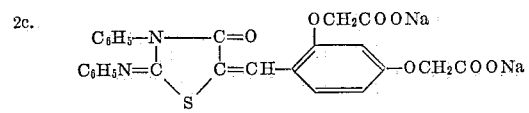

5-(2,4-dicarboxymethoxybenzal)-3-phenyl-2-phenylimino-
4-thiazolidone, disodium salt 2d.

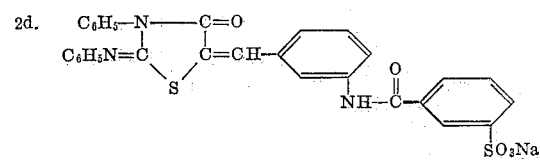

3-phenyl-2-phenylimino-5-[3-(3-sulfobenzamido)benzal]
4-thiazolidone, sodium salt 2e.

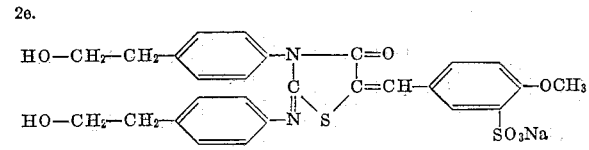

3-p-(β-hydroxyethyl)phenyl-2-p-(β-hydroxyethyl)phenylimino-
5-(4-methoxy-3-sulfobenzal)-4-thiazolidone, sodium salt III. Substituted 2-phenylbenzotriazoles of general formula:

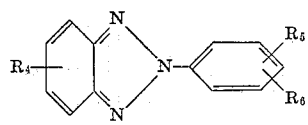

wherein $R_4$, $R_5$ and $R_6$ may represent hydrogen, lower alkyl or alkoxy, hydroxyl, amino or substituted amino, halogen, nitro, sulfo (including alkali metal salts thereof) and carboxy (including alkali metal salts thereof) groups.

Typical useful compounds in this class are:

3a.

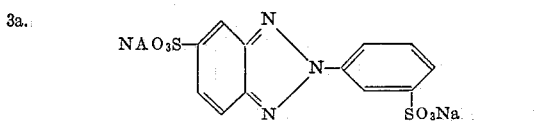

2-(5'-sulfophenyl)-5-sulfobenzotriazole, disodium salt

3b.

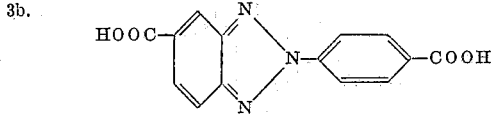

2-(4'-carboxyphenyl)-5-carboxybenzotriazole

IV. Substituted benzoyl resorcinols of general formula:

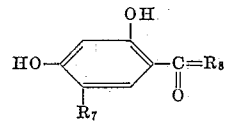

wherein $R_7$ represents lower alkyl (such as those represented by R) and lower alkoxy (such as those represented by R); $R_8$ represents a sulfoaryl group (such as o-, m- and p-sulfophenyl), a carboxyaryl group (such as o-, m- and p-carboxyphenyl), a sulfo-substituted benzamidoaryl group, a carboxy-substituted benzamidoaryl group. The alkali metal salts of these sulfo and carboxy groups may also be utilized.

Typical useful compounds in this class are:

4a.

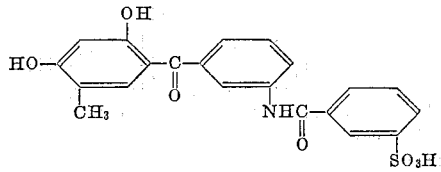

4-[3-(sulfobenzamido)benzoyl]-1-methylresorcinol

4b.

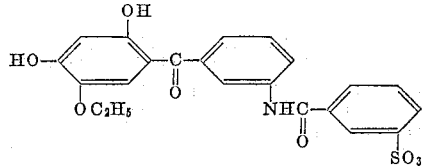

4-[3-(3-sulfobenzamido)benzoyl]-6-ethoxyresorcinol

4c.

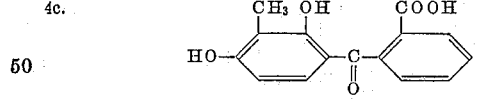

4-o-carboxybenzoyl-2-methylresorcinol

4d.

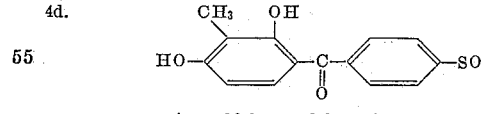

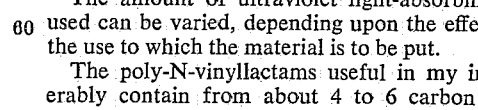

4-p-sulfobenzoyl-2-methylresorcinol

The amount of ultraviolet light-absorbing compounds used can be varied, depending upon the effect desired and the use to which the material is to be put.

The poly-N-vinyllactams useful in my invention preferably contain from about 4 to 6 carbon atoms in the lactam ring and have a molecular weight of about from 1,000 to 100,000 although materials with even higher molecular weights may be utilized if desired. Representative useful compounds are poly-N-vinylpyrrolidone, poly-N-vinyl-5-methyl-2-pyrrolidone, poly-N-vinyl caprolactam, etc. The amount of the poly-N-vinyllactam mordant utilized can be varied depending upon the effect desired and mixtures of two or more of the lactams may be utilized if desired.

Various mordants are known in the art for use with various dyes and ultraviolet light absorbers. The prior art mordants, however, while effective as dye mordants, also tend to mordant various materials present in processing solutions, which then cause the element to exhibit undesirable stain during or after processing. The following examples, which are designed to illustrate my invention, demonstrate that the poly-N-vinyllactam mordants of my invention effectively mordant the ultraviolet light absorbers but do not tend to mordant any of the processing components and do not, therefore exhibit any undesirable stain due to such mordanting either during or after processing.

*Example I*

To compare the mordants of my invention with a conventional mordant, the following coatings were made on separate clear cellulose acetate film supports.

Coating 1: Gelatin, 91 mg. per sq. ft.
Coating 2: Ultraviolet light absorber,[1] 80 mg. per sq. ft.+poly - N - vinylpyrrolidone, 200 mg. per sq. ft.+gelatin, 50 mg. per sq. ft.
Coating 3: Ultraviolet light absorber,[1] 40 mg. per sq. ft.+poly-α-methyl allyl-N-guanidyl ketimine glycolate (U.S. Patent 2,882,156), 60 mg. per sq. ft.+gelatin, 200 mg. per sq. ft.

[1] 2,5 - bis(2-o-methyl-x-sulfophenyl)thiazolo-[5,4-d]-thiazole, disodium salt.

Spectrophotometric curves were obtained on these coatings before and after imbibition in a conventional process of the following type. The coatings were immersed for 4 minutes in a black-and-white developer of the following composition:

|  | G. |
|---|---|
| Sodium hexametaphosphate | 1.0 |
| Sodium sulfite (anhydrous) | 72.0 |
| N-methyl-p-aminophenol sulfate | 5.0 |
| Sodium carbonate (monohydrate) | 36.0 |
| Hydroquinone | 2.0 |
| Sodium bromide | 2.0 |
| Sodium sulfate | 15.0 |
| Potassium iodide | 0.01 |
| Sodium thiocyanate | 1.0 |
| Hydroquinone monosulfonate | 1.5 |
| Water to make one liter. | |

The coatings were then washed in water for 2 minutes and then immersed for 2 minutes in the following magenta color developer:

| | G. |
|---|---|
| Sodium hexametaphosphate | 0.5 |
| Sodium sulfite (anhydrous) | 3.0 |
| 4 - amino-N-ethyl-3-methyl-N-β-methylsulfonamidoethyl aniline | 6.0 |
| Sodium carbonate (monohydrate) | 30.0 |
| Sodium bromide | 0.25 |
| 1.0% 6-nitrobenzimidazole nitrate | 2.5 ml |
| 0.1% potassium iodide | 2.0 ml |
| Sodium sulfate | 25.0 |
| Citrazinic acid | 3.0 |
| Polyethylene glycol (M.W. 1540) | 1.0 |
| Sodium thiocyanate | 4.0 |
| 1 - (2,4,6 - trichlorophenyl)-3-[α-(4-nitrophenoxyacetamide)]-5-pyrazolone | 2.0 |
| Water to make one liter. | |

The coatings were then washed for 10 minutes and treated for 2 minutes in a silver bleach bath of the following composition:

| | G. |
|---|---|
| Potassium ferricyanide | 100 |
| Potassium bromide | 10 |
| Borax | 7.5 |
| Boric acid | 5.0 |
| Water to make one liter. | |

The coatings were then rinsed in water and treated for 2 minutes in a fixing bath of the following composition, washed and dried:

| | G. |
|---|---|
| Sodium thiosulfate (pentahydrate) | 200 |
| Sodium sulfite (anhydrous) | 10 |
| Water to make one liter. | |

The following data were obtained:

TABLE A

| Coating No. | λ max. (mμ) | Before treatment Density | | | After Treatment Visual Density | | | Ultraviolet Density | | |
|---|---|---|---|---|---|---|---|---|---|---|
| | | 400 mμ | 420 mμ | 450 mμ | 400 mμ | 420 mμ | 450 mμ | 360 mμ | 372 mμ | 391 mμ |
| 1 | 350 | 0.07 | 0.06 | 0.06 | 0.30 | 0.22 | 0.15 | 0.32 | 0.34 | 0.32 |
| 2 | 405 | >2.30 | 0.30 | 0.06 | 0.30 | 0.23 | 0.14 | 0.30 | 0.32 | 0.32 |
| 3 | 380 | 1.37 | 0.38 | .090 | 1.00 | 0.66 | 0.38 | 1.06 | 1.16 | 1.07 |

It is evident that the conventional mordant utilized in Coating 3 tended to exhibit high yellow stain after "processing" as evidenced by its high density, to both visual observation and to ultraviolet light. In contradistinction, the poly-N-vinyllactam mordant layer of this invention (Coating 2) did not exhibit any stain after "processing" as evidenced by densities, both visual and to ultraviolet light, similar to that of the gelatin control (Coating 1).

*Example II*

The three coatings described in Example I above and an addition coating, Coating 4, which consisted of 80 mg./sq. ft. of polyvinylpyridine, a mordant known in the art, and 454 mg. of gelatin per sq. ft. coated on a clear cellulose acetate support, were put through the treatment cycle described in Example I. The background density of the dried, processed strips was then read through red, green and blue filters. The following data were obtained.

TABLE B

| Coating No. | Density (After Processing) | | |
|---|---|---|---|
| | Red | Green | Blue |
| 1 | 0.03 | 0.05 | 0.13 |
| 2 | 0.03 | 0.06 | 0.14 |
| 3 | 0.04 | 0.08 | 0.40 |
| 4 | 0.03 | 0.09 | 0.50 |

The high density through the blue filter of "processed" Coatings 3 and 4, which contained conventional mordant layers, is evidence of the formation of high yellow stain in these coatings. Processed Coating 2, which contained the mordant layer of this invention exhibited a blue density similar to that of the gelatin control layer, indicating that no yellow stain was obtained in this coating after treatment.

*Example III*

Coatings 1 and 2, prepared as described in Example I, were put through an entire color reversal process of the following type, and the red, green and blue densities obtained as described in Example II above:

(1) Prehardener:
Sulfuric acid (conc.) _____g-- 2.3
Sodium metaborate (pentahydrate) _____g-- 15.0
Sodium bromide _____g-- 2.0
Sodium sulfite (anhydrous) _____g-- 200.0
Formalin _____ml-- 20
Sodium bisulfite _____g-- 1.0
Sodium tetraphosphate _____g-- 0.6
Water to make one liter.
(2) Water wash.
(3) Black and white developer as described in Example I.
(4) Water wash.
(5) Cyan-forming developer:
Hydroxylamine sulfate _____g-- 0.5
Sodium hexametaphosphate _____g-- 1.0
Sodium sulfite (anhydrous) _____g-- 10.0
4 - amino - N - ethyl - N - ($\beta$ - hydroxyethyl)-m-toluidine _____g-- 1.3
Sodium bromide _____g-- 2.5
Sodium sulfate _____g-- 60.0
0.1% solution potassium iodide _____ml-- 8.0
1.0% solution 6 - nitrobenzimidazole nitrate _____ml-- 0.03
Sodium thiocyanate _____g-- 1.0
2 - (o - acetamido - $\beta$ - phenethyl) - 1 - hydroxynaphthamide _____g-- 1.45
Hexylene glycol _____ml-- 10
Monobenzyl-p-aminophenol _____g-- 0.4
Polyethylene glycol (M.W. 1540) _____g-- 1.0
Water to make one liter.
(6) Yellow-forming developer:
Sodium hexametaphosphate _____g-- 1.0
Sodium sulfite (anhydrous) _____g-- 10.0
2 - methyl - 4 - (methylsulfonamide ethyl) ethyl aniline _____g-- 2.0
Sodium bromide _____g-- 0.7
Sodium sulfate _____g-- 64.0
0.1% solution potassium iodide _____ml-- 20.0
1.0% solution 6 - nitrobenzimidazole nitrate _____ml-- 0.06
10.0% solution diethylhydroxylamine oxalate _____ml-- 5.0
$\alpha$-Benzoyl-2-methoxyacetanilide _____g-- 2.0
Hexylene glycol _____ml-- 20.0
1-phenyl-3-pyrazolidone _____g-- 0.4
Polyethylene glycol (M.W. 6000) _____g-- 1.0
Water to make one liter.
(7) Magenta-forming developer as described in Example I.
(8) Water wash.
(9) Fixing bath:
Sodium hexametaphosphate _____g-- 10.0
Sodium sulfite (anhydrous) _____g-- 10.0
Sodium thiosulfate (pentahydrate) _____g-- 320.0
Water to make one liter.
(10) Water wash.
(11) Ferricyanide silver bleach:
Sodium hexametaphosphate _____g-- 1.0
Potassium ferricyanide _____g-- 80.0
Sodium bromide _____g-- 34.4
Water to make one liter.
(12) Fixing bath as described above.
(13) Water wash.
(14) Drying.

The following data were obtained:

TABLE C

| Coating No. | Density (After Processing) | | |
|---|---|---|---|
| | Red | Green | Blue |
| 1 | .04 | .08 | .10 |
| 2 | .04 | .08 | .10 |

It is evident that the coating containing the mordant layer of my invention exhibited no stain when put through the complete color reversal process described above and was, in fact, equivalent to the gelatin control.

The coatings of Examples I–III above contained no silver halide and were run to show the precise degree of contamination produced by imbibition of processing chemicals. The following coatings show similar effects in actual photographic processing.

*Example IV*

A multilayer color film comprising a cellulose acetate support having superimposed gelatino-silver bromoiodide emulsion layers differently sensitized to blue, green and red light as described in Mannes et al. U.S. Patent 2,252,718, issued Aug. 19, 1941, was prepared.

Two samples of this film were taken and further treated as follows: One sample was provided with an overcoat of 91 mg. of gelatin per sq. ft. and designated as Coating 5.

The second sample was provided with an overcoat of 40 mg. per sq. ft. of the ultraviolet light absorbing dye, 2,5 - bis(2-o-methoxy - x - sulfophenyl)thiozolo[5,4 - d] thiazole, disodium salt, in 80 mg. per sq. ft. of poly-N-vinylpyrrolidone and 40 mg. per sq. ft. of gelatin and designated as Coating 6.

These coatings, since they contain light-sensitive layers, were exposed as described in Mannes et al. U.S. Patent 2,252,718 and then processed in the complete color reversal process described in Example III above.

The following data were obtained:

TABLE D

| Coating No. | $D_{min.}$ | | |
|---|---|---|---|
| | Red | Green | Blue |
| 5 | .13 | .18 | .22 |
| 6 | .12 | .19 | .21 |

It was apparent that Coating 6, which contained the ultraviolet absorbing dye-mordant layer of my invention did not exhibit any greater stain after processing than did the gelatin control as evidenced by their substantially equal minimum densities.

*Example V*

A multilayer color film comprising a cellulose acetate support containing several superimposed high-speed gelatino-silver bromoiodide emulsion layers differentially sensitized to blue, green and red light was prepared as described in U.S. Patent 2,322,027. The emulsion layer sensitive in the blue range contained a dispersion of an open-chain coupler having a reactive methylene group suitable for forming the yellow image with oxidized color developer, e.g., any one of couplers numbered I to V of McCrossen et al. U.S. Patent 2,875,057 in dibutyl phthalate. The emulsion layer sensitive in the green range contained a dispersion of a pyrazolone coupler suitable for forming the magenta image with oxidized color developer, e.g., Coupler 7, etc., of Fierke et al. U.S. Patent 2,801,171 (column 2) in dibutyl phthalate. The emulsion layer sensitive in the red range contained a dispersion of a phenolic coupler suitable for forming the cyan image with oxidized color developer, e.g., Couplers 1 to 6 of Fierke et al. U.S. Patent 2,801,171 (column 2) in a solvent, such as tri-o-cresyl phosphate.

Four samples of this film were taken and further treated and designated as follows:

*Sample 1.*—Overcoated with 90 mg. of gelatin per sq. ft. and designated Coating No. 7.

*Sample 2.*—Overcoated with 90 mg. of poly-N-vinylcaprolactam per sq. ft., 45 mg. of gelatin per sq. ft. and 40 mg. of 3-phenyl-2-phenylimino-5-o-sulfobenzal-4-thiazolidone sodium salt, per sq. ft.

*Sample 3.*—Overcoated with 90 mg. of poly-N-vinyl-5-methyl-2-pyrrolidone per sq. ft., 45 mg. of gelatin per sq. ft. and 40 mg. of 3-phenyl-2-phenylimino-5-o-sulfobenzal-4-thiazolidone, sodium salt per sq. ft., and designated Coating No. 9.

*Sample 4.*—Overcoated with 90 mg. of poly-N-vinylpyrrolidone per sq. ft., 45 mg. of gelatin per sq. ft. and 40 mg. of 2-(4'-carboxyphenyl)-5-carboxybenzotriazole per sq. ft. and designated Coating No. 10.

These four coatings were then exposed in an Eastman Ib sensitometer and processed in a color reversal process of the following type.

(1) Black-and-white developer:
Sodium hexametaphosphate _____g__ 2.0
n-Methyl-p-aminophenol sulfate _____g__ 6.0
Sodium sulfite (anhydrous) _____g__ 50.0
Hydroquinone _____g__ 6.0
Sodium carbonate (monohydrate) _____g__ 35.0
Potassium bromide _____g__ 2.0
Sodium thiocyanate _____g__ 1.5
0.5% solution 6 - nitrobenzimidazole nitrate _____ml__ 12.0
0.1% solution potassium iodide _____ml__ 10.0
Water to make one liter.

(2) Water wash.
(3) Hardening bath:
Potassium chrome alum crystals _____g__ 30.0
Water to make one liter.

(4) Water wash.
(5) Flashed with white light for a period sufficient to expose residual silver halide.
(6) Color developer:
Benzyl alcohol _____ml__ 6.0
Sodium hexametaphosphate _____g__ 2.0
Sodium sulfite (anhydrous) _____g__ 5.0
Trisodium phosphate _____g__ 40.0
Potassium bromide _____g__ 0.25
0.1% solution potassium iodide _____ml__ 10.0
Sodium hydroxide _____g__ 6.5
4 - amino - N-ethyl-N-($\beta$-methanesulfonamidoethyl)-m-toluidine sesquisulfate monohydrate
_____g__ 11.33
Ethylenediamine sulfate _____g__ 7.8
Citrazinic acid _____g__ 1.5
Water to make one liter.

(7) Water wash.
(8) Fixing and clearing bath:
Sodium thiosulfate (pentahydrate) _____g__ 150.0
Sodium bisulfite _____g__ 20.0
Water to make one liter.

(9) Silver bleach bath:
Potassium dichromate _____g__ 5.0
Potassium ferricyanide _____g__ 70.0
Potassium bromide _____g__ 20.0
Water to make one liter.

(10) Water wash.
(11) Fixing and clearing bath as described above.
(12) Water wash.
(13) Stabilizing bath:
Formaldehyde (37% by weight) _____ml__ 7.0

Dispersing agent [1] _____g__ 0.5
Water to make one liter.
(14) Dried.

[1] Such as Triton X-100, i.e., an alkylaryl polyether alcohol (octylphenoxy polyethoxy ethanol).

None of the processed film samples exhibited any stain. The minimum densities of processed Coatings 8, 9 and 10 which contained mordant layers of my invention, were substantially equivalent to those of Coating No. 7, the gelatin control coating.

It will be realized that the poly-N-vinyllactam mordant layers of my invention may contain any of the unballasted, diffusible, ultraviolet light absorbing compounds previously listed, or their equivalents. Ballasted, non-wandering ultraviolet light absorbing compounds have not been found to be useful in my invention since they are not readily removable during processing and, therefore, tend to exhibit high levels of undesirable stain due to their inherent yellowish color. By unballasted, diffusible ultraviolet light absorbing compounds, I mean materials which contain acid or acid forming groups and which are diffusible per se but when mordanted, become attracted to my poly-N-vinyllactam mordants and consequently become substantially non-diffusing and non-wandering therein until they are released again in the alkaline processing solutions.

The poly-N-vinyllactam mordants of my invention may be utilized at various levels. They are suitably used at levels of from about one to eight parts per part of colloidal binder utilized therein. The binder utilized may be gelatin or some other colloidal material, such as colloidal albumin, a cellulose derivative, such as hydrolyzed cellulose acetate or a synthetic resin, such as a polyvinyl acetal or a hydrolyzed polyvinylacetate, etc.

The ultraviolet light absorbing compounds of my invention can be utilized at various levels which may be determined by methods known to those skilled in the art. I have found, for example, that suitable levels are from about 10% to 100% of the ultraviolet light absorbing compound based on the weight of the poly-N-vinyllactam mordant therein.

The polyvinyllactam colloids, particularly polyvinylpyrrolidone, are also useful in preparing antihalation or filter, or backing layers since it has been found that they strongly combine with acid dyes without precipitating them, yet the dye is readily removable in aqueous alkaline solutions. The polyvinyllactam colloids retain the dye and prevent its diffusion prematurely between layers of a multilayer photographic element or from dyed backing layers to contiguous emulsion layers when the coated film elements are stacked or rolled up.

If desired, matting agents, particularly alkali-soluble matting agents, such as finely-divided particles of cellulose acetate phthalate, can be added to the polyvinyllactam colloid layers.

The invention has been described in detail with particular reference to preferred embodiments thereof, but it will be understood that variations and modifications can be effected within the spirit and scope of the invention as described hereinabove and as defined in the appended claims.

What I claim as my invention and desire secured by Letters Patent of the United States is:

1. A multilayer photographic element comprising a support having thereon a plurality of differentially sensitive photographic silver halide emulsion layers and an ultraviolet light-absorbing layer positioned in the said element to provide effective protection from undesirable ultraviolet radiation during exposure, said ultraviolet light-absorbing layer comprising a water-permeable poly-N-vinyllactam colloid having dispersed therein an unballasted material capable of absorbing ultraviolet light but transmitting substantially all visible light rays and which is substantially nondiffusible when dispersed therein but substantially diffusible in aqueous, alkaline solutions so that the said photographic element is provided with effective protection from undesirable ultraviolet radiation during exposure, without retaining said ultraviolet absorber and processing chemicals after processing which cause stain in the said element.

2. A multilayer photographic element comprising a support having thereon a plurality of differentially sensitive photographic silver halide emulsion layers and an ultraviolet light-absorbing layer positioned in the said element to provide effective protection from undesirable ultraviolet radiation during exposure, said ultraviolet light-absorbing layer comprising a water-permeable poly-N-vinyllactam colloid and dispersed therein an unballasted material capable of absorbing ultraviolet light but transmitting substantially all visible light rays, which material contains at least one group selected from the class of acid, and acid-forming groups, which render the material substantially non-diffusible when dispersed therein but substantially diffusible in aqueous, alkaline solutions so that the said photographic element is provided with effective protection from undesirable ultraviolet radiation during exposure, without retaining said ultraviolet absorber and processing chemicals after processing which cause stain in the said element.

3. A multilayer photographic element comprising a support having thereon a plurality of differentially sensitive gelatino-silver halide emulsion layers and an ultraviolet light-absorbing layer positioned in the said element to provide effective protection from undesirable ultraviolet radiation during exposure, said ultraviolet light-absorbing layer comprising a water-permeable poly-N-vinyllactam colloid and dispersed therein an unballasted material capable of absorbing ultraviolet light but transmitting substantially all visible light rays which material contains at least one group selected from the class consisting of acid and acid-forming groups which render the material substantially non-diffusible when dispersed therein but substantially diffusible in aqueous alkaline solutions so that the said photographic element is provided with effective protection from undesirable ultraviolet radiation during exposure, without retaining said ultraviolet absorber and processing chemicals after processing which cause stain in the said element.

4. A multilayer photographic element as defined in claim 3 wherein the poly-N-vinyllactam colloid is poly-N-vinylpyrrolidone.

5. A multilayer photographic element comprising a support having thereon a plurality of gelatino-silver halide emulsion layers sensitive, respectively, to red, green and blue regions of the spectrum and over said emulsion layers an ultraviolet light-absorbing layer comprising a water-permeable poly-N-vinyllactam colloid and dispersed therein an unballasted material capable of absorbing ultraviolet light but transmitting substantially all visible light rays which material contains at least one group selected from the class consisting of acid and acid-forming groups which render the material substantially non-diffusible when dispersed therein but substantially diffusible in aqueous, alkaline solutions so that the said photographic element is provided with effective protection from undesirable ultraviolet radiation during exposure, without retaining said ultraviolet absorber and processing chemicals after processing which cause stain in the said element.

6. A multilayer photographic element as defined in claim 5 wherein said ultraviolet absorbing compound is a compound selected from the class consisting of those represented by the following general formulas:

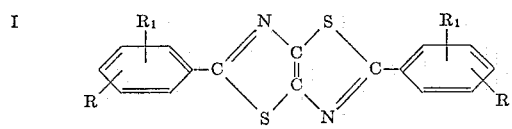

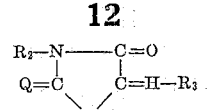

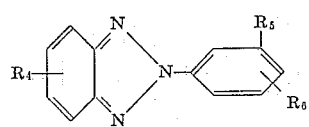

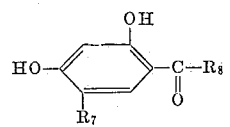

wherein R represents a member selected from the class consisting of hydrogen, lower alkyl, lower alkoxy, hydroxyl, halogen and amino, $R_1$ represents a radical selected from the class consisting of sulfo and carboxy, $R_2$ represents a member selected from the class consisting of hydrogen, lower alkyl, lower alkoxy and aryl, $R_3$ represents a member selected from the class consisting of sulfoaryl and carboxyaryl, Q represents a divalent, non-metallic radical, $R_4$, $R_5$ and $R_6$ each represents a member selected from the class consisting of hydrogen, lower alkyl, lower alkoxy, hydroxyl, amino, halogen, sulfo and carboxy, $R_7$ represents a member selected from the class consisting of lower alkyl and lower alkoxy, and $R_8$ represents aryl, sulfobenzamido, and carboxybenzamido.

7. A multilayer photographic element as defined in claim 5 wherein the ultraviolet light-absorbing material is 2,5-bis(2-o-methoxy-x-sulfophenyl)thiazolo[5,4-d]thiazole.

8. A multilayer photographic element as defined in claim 5 wherein the ultraviolet light-absorbing material is 3-phenyl-2-phenylimino-5-o-sulfobenzal-4-thiazolidone.

9. A multilayer photographic element as defined in claim 5 wherein the ultraviolet light-absorbing material is 2-(4'-carboxyphenyl)-5-carboxybenzotriazole.

10. In a complete photographic reversal color process comprising a multilayer photographic element containing a plurality of differentially sensitized photographic silver halide emulsion layers which after a first exposure, is followed by development in a photographic developer for producing a black-and-white negative image and at least one additional exposure followed by at least one additional development in a photographic developer for producing a colored image, said colored image bearing a complementary relationship to the region of the spectrum to which said photographic silver halide emulsion layer has been differentially sensitized, the improvement which comprises utilizing a multilayer photographic element which contains an ultraviolet light-absorbing layer positioned in the said element to provide effective protection from undesirable ultraviolet radiation during exposure, said ultraviolet light-absorbing layer comprising a water-permeable poly-N-vinyllactam colloid and dispersed therein an unballasted material capable of absorbing ultraviolet light but transmitting substantially all visible light rays and which is substantially non-diffusible when dispersed therein but substantially diffusible in aqueous, alkaline solutions so that the said photographic element is provided with effective protection from undesirable ultraviolet radiation during exposure, without retaining said ultraviolet absorber and processing chemicals after processing which cause stain in the said element.

11. In a complete photographic reversal color process comprising a multilayer photographic element containing a plurality of differentially sensitized photographic silver halide emulsion layers which after a first exposure, is followed by development in a photographic developer for producing a black-and-white negative image and at least one additional exposure followed by at least one additional development in a photographic developer for producing a colored image, said colored image bearing a complementary relationship to the region of the spectrum to which said photographic silver halide emulsion layer has been differentially sensitized, the improvement which comprises utilizing a multilayer photographic element which contains an ultraviolet light-absorbing layer positioned in the said element to provide effective protection from undesirable ultra-violet radiation during exposure, said ultraviolet lights absorbing layer comprising a water-permeable poly-N-vinyllactam colloid and dispersed therein an unballasted material capable of absorbing ultraviolet light but transmitting substantially all visible light rays which material contains at least one group selected from the class consisting of acid and acid-forming groups, which render the material substantially non-diffusible when dispersed therein but substantially diffusible in aqueous, alkaline solutions so that the said photographic element is provided with effective protection from undesirable ultraviolet radiation during exposure, without retaining said ultraviolet absorber and processing chemicals after processing which cause stain in the said element.

12. A complete photographic reversal color process as defined in claim 11 wherein the poly-N-vinyllactam colloid is poly-N-vinylpyrrolidone.

13. A complete photographic reversal color process as defined in claim 11 wherein said ultraviolet light-absorbing compound is a compound selected from the class consisting of those represented by the following general formulas:

I 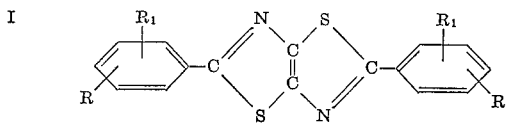

II 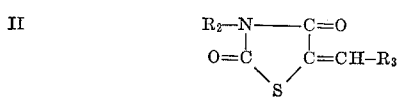

III 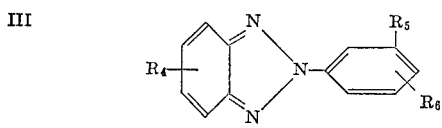

IV 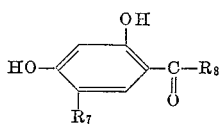

wherein R represents a member selected from the class consisting of hydrogen, lower alkyl, lower alkoxy, hydroxyl, halogen and amino, $R_1$ represents a radical selected from the class consisting of sulfo and carboxy, $R_2$ represents a member selected from the class consisting of hydrogen, lower alkyl, lower alkoxy and aryl, $R_3$ represents a member selected from the class consisting of sulfoaryl and carboxyaryl, Q represents a divalent, non-metallic radical, $R_4$, $R_5$ and $R_6$ each represents a member selected from the class consisting of hydrogen, lower alkyl, lower alkoxy, hydroxyl, amino, halogen, sulfo and carboxy, $R_7$ represents a member selected from the class consisting of lower alkyl and lower alkoxy, and $R_8$ represents aryl, sulfobenzamido, and carboxybenzamido.

14. A complete photographic reversal color process as defined in claim 13 wherein the ultraviolet light-absorbing material is 2,5-bis(2-o-methoxy-x-sulfophenyl)thiazolo[5,4-d]thiazole.

15. A complete photographic reversal color process as defined in claim 13 wherein the ultraviolet light-absorbing material is 3-phenyl-2-phenylimino-5-o - sulfobenzal - 4-thiazolidone.

16. A complete photographic reversal color process as defined in claim 13 wherein the ultraviolet light-absorbing material is 2-(4'-carboxyphenyl)-5-carboxybenzotriazole.

References Cited

UNITED STATES PATENTS

| | | | |
|---|---|---|---|
| 2,495,918 | 1/1950 | Bolton | 96—114 |
| 2,719,086 | 9/1955 | Sawdey | 95—2 |
| 2,808,330 | 10/1957 | Sawdey | 96—11 |
| 3,072,585 | 1/1963 | Milionis | 260—22 |
| 3,227,550 | 1/1966 | Whitmore | 96—3 |
| 3,246,987 | 4/1966 | Hanson | 96—59 |
| 3,249,432 | 5/1966 | Haas | 96—29 |
| 3,250,617 | 5/1966 | Sawdey | 96—55 |

NORMAN G. TORCHIN, *Primary Examiner.*

R. E. MARTIN, *Assistant Examiner.*